July 11, 1950
T. McCLINTOCK
2,515,016
TWO PLOW HITCH
Filed Nov. 19, 1946
2 Sheets-Sheet 2
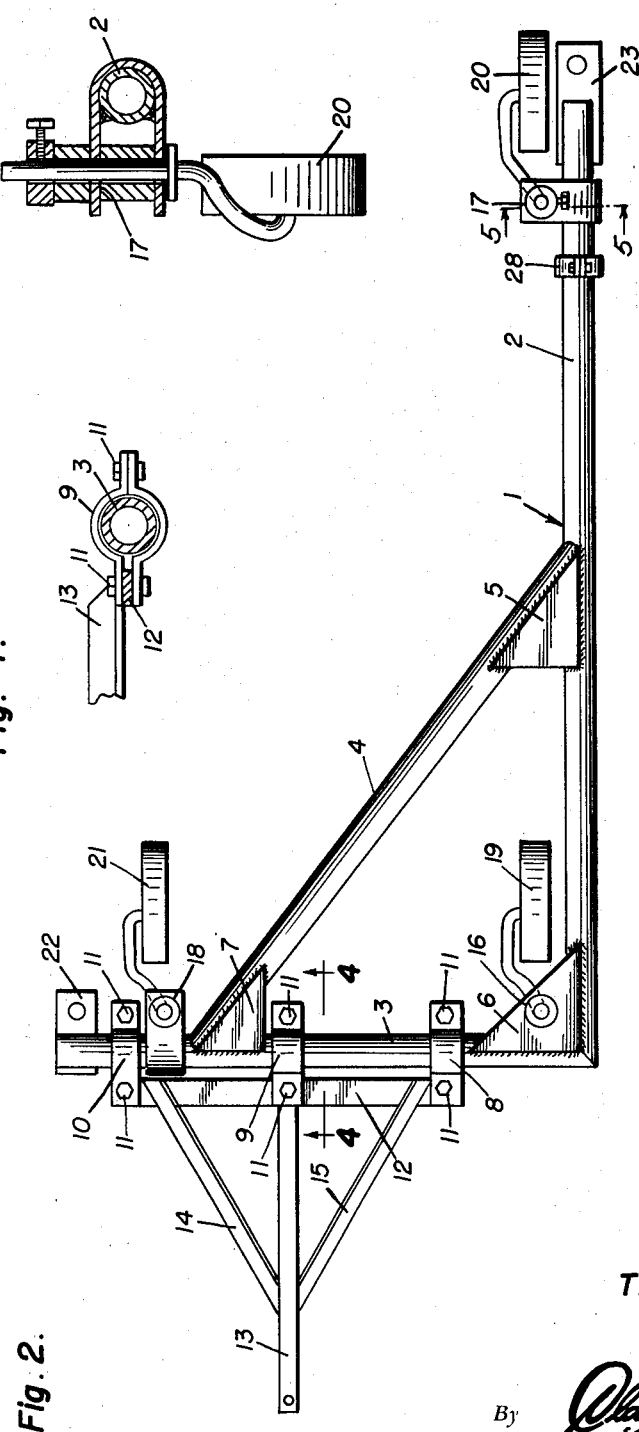
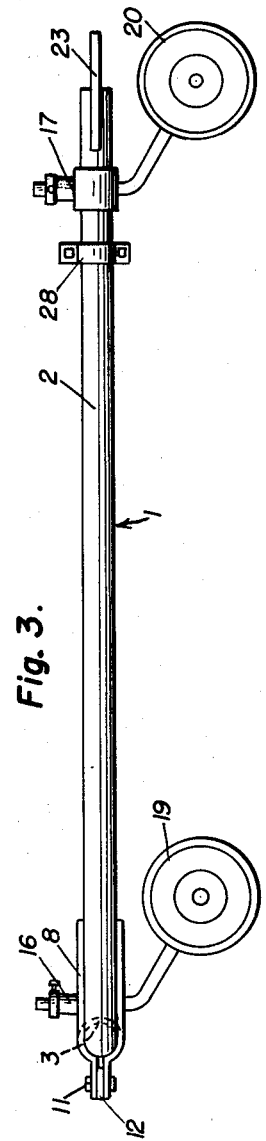
Inventor
Tress Mc Clintock
By *Clarence A. O'Brien and Harvey B. Jacobson*
Attorneys

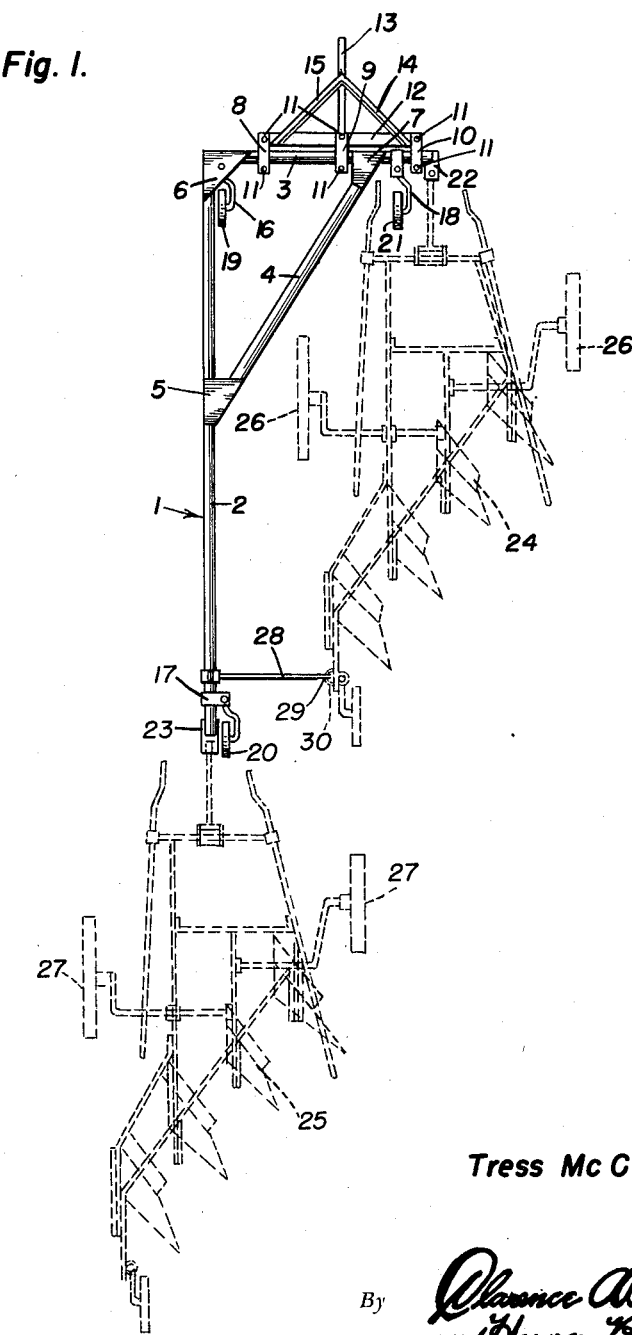

Patented July 11, 1950

2,515,016

UNITED STATES PATENT OFFICE 2,515,016

TWO PLOW HITCH

Tress McClintock, Heppner, Oreg.

Application November 19, 1946, Serial No. 710,899

4 Claims. (Cl. 97—199)

1

This invention relates to improvements in two plow hitch constructions.

An object of the invention is to provide an improved wheel supported hitch for two gangs of plows, the same including an L-shaped main frame and an angularly disposed reinforcing walking beam connected between the legs of said main frame, and a tongue attached to said main frame for connection with a tractor whereby the plows may be efficiently and effectively operated.

Another object of the invention is to provide an improved form of wheel supported two plow hitch whereby a single tractor may pull two, three, four or five bottom plows behind it.

A further object of the invention is to provide an improved two plow tractor hitch which may be readily detached from the plows when it is to be moved to another location, leaving the plows either in the ground, or with one plow in the ground and the other plow on the surface thereof, where their position will not be changed until they are again hitched to the tractor by means of the hitch forming the subject matter of the instant invention.

Another object of the invention is to provide an improved two plow hitch for connecting two plows to a tractor, said hitch being highly efficient in operation and relatively inexpensive to manufacture and produce.

Other objects will appear as the description proceeds.

In the accompanying drawings which form a part of this application,

Figure 1 is a plan view of the improved hitch showing two bottom or gang plows in dotted lines connected therewith;

Figure 2 is an enlarged plan view of the improved wheel supported hitch;

Figure 3 is a side elevation of the improved wheel supported hitch;

Figure 4 is a sectional view taken on the line 4—4 of Figure 2, and

Figure 5 is a sectional view taken on the line 5—5 of Figure 2.

Like characters of reference are used throughout the following specification and the accompanying drawings to designate corresponding parts.

In carrying out the invention, there is provided an improved form of two plow hitch including an L-shaped main frame generally designated by the reference numeral 1 and comprising a longitudinally extending tubular pipe or main frame leg 2 and a laterally disposed front tubular pipe or base frame leg 3 suitably connected to the front end of said main frame leg 2.

An angular disposed bracing leg or walking beam 4, also made of tubular pipe, is suitably connected to said main frame leg 2 and to the base frame leg 3 to extend at an angle between said

2 parts forming a triangularly shaped frame construction at the forward end of the hitch.

Three reinforcing webs 5, 6 and 7 will be welded or otherwise connected between the adjacent connected ends of the frame members 2, 3 and 4.

Three split brackets 8, 9 and 10 will be disposed in spaced relation about the base frame leg 3 of the hitch 1, and will be secured in fixed relation by means of the bolts 11 extending therethrough. A cross frame member 12 will be secured to the brackets 8, 9 and 10 by means of said bolts 11 and a forwardly extending tongue 13 will be also connected at its rear end to the split bracket 9 by means of one of the bolts 11.

Angularly disposed braces 14 and 15 will be secured between the tongue 13 and the cross frame member 12 to reinforce the said tongue 13.

Bearing brackets 16, 17 and 18 will be secured to the front and rear ends of the main frame leg 2 and to the outer end of the base frame leg 3, to pivotally support and provide bearings for the three crazy wheels 19, 20 and 21 respectively.

The brackets 22 and 23 will be connected respectively to the outer end of the base frame leg 3 and to the rear of the main frame leg 2 for attaching the front and rear plows 24 and 25 to said hitch 1.

Inasmuch as the hitch is supported upon the three crazy wheels 19, 20 and 21, the weight of the hitch will not be placed upon the plows 24 and 25, which are supported upon the wheels 26 and 27 respectively.

A jockey bar 28 will be attached to the rear end of the main frame leg 2 to extend laterally therefrom, and will be provided with hook means 29 on its outer or opposite end for connection with an eye or keeper 30 upon the rear end of the front plow 24 for holding the front plow in proper alignment with the tractor (not shown) when plowing.

From the foregoing description, it will be apparent that the plows 24 and 25 may be left in the ground or on the surface thereof, and the hitch detached therefrom and moved to another location, to be attached to other plows for pulling and operating the same.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A two plow hitch comprising an L-shaped frame including a longitudinally extending main frame leg and a laterally extending base frame leg, an angularly disposed walking beam or bracing leg connected between said main frame leg and said base frame leg, a tongue supported by said base frame leg and crazy wheels disposed at the ends of said frame legs.

2. A two plow hitch comprising an L-shaped frame including a longitudinally extending main frame leg and a laterally extending base frame leg, an angularly disposed bracing leg connected between the said main frame leg and said base frame leg, a tongue, a cross frame member secured to the tongue and supported by said base frame leg, rearwardly and outwardly extending braces terminally secured to said tongue and said cross frame member, crazy wheels supported at the ends of frame legs, and plow attaching brackets on the outer end of said base frame leg and on the rear of said main frame leg.

3. A two plow hitch comprising an L-shaped frame including a longitudinally extending main frame leg and a laterally extending base frame leg, an angularly disposed bracing leg terminally fixed to said main frame leg and said base frame leg, a tongue, a cross frame member secured to said tongue and supported by said base frame leg, rearwardly and outwardly extending braces connected between said tongue and said cross frame member, crazy wheels supported at the ends of said frame legs, plow attaching brackets on the outer end of said base frame leg and on the rear of said main frame leg, and a jockey bar supported at the rear of said main frame leg adapted to be connected with a plow when attached to the attaching bracket on the outer end of said base frame leg.

4. A two plow hitch comprising an L-shaped frame including a longitudinally extending main frame leg and a laterally extending base frame leg, an angularly disposed walking beam connected between said main frame leg and said base frame leg, reinforcing webs secured at the inner sections of said main frame leg, base frame leg and walking beam, a tongue, a cross frame member supporting the tongue and mounted on said base frame leg, rearwardly and outwardly extending braces terminally secured to said tongue and said cross frame member, wheels supported at the ends of said frame legs, plow attaching brackets on the outer end of said base frame leg and on the rear of said main frame leg, and a jockey bar connected to the rear of said main frame leg adapted to be connected to a plow when attached to the plow attaching bracket on the outer end of said base frame leg.

TRESS McCLINTOCK.

REFERENCES CITED

The following references are of record in the file of this patent:

UNITED STATES PATENTS

| Number | Name | Date |
|---|---|---|
| 422,167 | Todd | Feb. 25, 1890 |
| 1,721,694 | Graham | July 23, 1929 |
| 1,740,751 | Smith | Dec. 24, 1929 |
| 2,008,483 | Ball | July 16, 1935 |
| 2,136,550 | Howard | Nov. 15, 1938 |
| 2,165,019 | Van Patten | July 4, 1939 |